(12) United States Patent
Walkemeyer

(10) Patent No.: US 6,279,262 B1
(45) Date of Patent: Aug. 28, 2001

(54) HAND-HELD DEVICE FOR CATCHING AND TRAPPING INSECTS

(76) Inventor: Richard W. Walkemeyer, 3501 Twining Ave., North Las Vegas, NV (US) 89030

( * ) Notice: Subject to any disclaimer, the term of this patent is extended or adjusted under 35 U.S.C. 154(b) by 0 days.

(21) Appl. No.: 08/714,360

(22) Filed: Sep. 16, 1996

(51) Int. Cl.[7] ................................................ A01M 3/00
(52) U.S. Cl. ................................ 43/134; 43/137; 43/135
(58) Field of Search ........................... 43/134, 135, 136, 43/137

(56) References Cited

U.S. PATENT DOCUMENTS

| | | | |
|---|---|---|---|
| 1,099,342 | * | 6/1914 | Copenhaven ........................ 43/137 |
| 1,323,509 | * | 12/1919 | Anklam ............................ 43/135 |
| 1,356,371 | * | 10/1920 | Jolly .............................. 43/135 |
| 1,480,245 | * | 1/1924 | Dailey ............................ 43/135 |
| 1,515,158 | * | 11/1924 | Miller ............................. 43/135 |
| 1,660,011 | * | 2/1928 | Linding ........................... 43/137 |
| 1,664,762 | * | 4/1928 | Voss .............................. 43/137 |
| 2,191,126 | * | 2/1940 | Gustke ............................ 43/135 |
| 2,434,364 | * | 1/1948 | Linding ........................... 43/137 |
| 2,496,415 | * | 2/1950 | Sharpe ............................ 43/137 |
| 2,545,215 | * | 3/1951 | Sharpe ............................ 43/137 |
| 2,776,520 | * | 1/1957 | Weeks ............................. 43/135 |
| 3,191,339 | * | 6/1965 | Dougherty ......................... 43/137 |
| 3,308,571 | * | 3/1967 | Jones ............................. 43/135 |
| 5,027,549 | * | 7/1991 | Person ............................ 43/134 |

FOREIGN PATENT DOCUMENTS

| | | | | |
|---|---|---|---|---|
| 82927 | * | 4/1920 | (CH) | .................................. 43/135 |
| 54939 | * | 6/1938 | (DK) | .................................. 43/135 |

* cited by examiner

*Primary Examiner*—Kurt Rowan

(57) ABSTRACT

A light-weight, easily manipulatable, hand-held sanitary device for snappily catching and/or trapping both airborne insects or bugs as well as crawling or stationary ones, comprising, in combination, in at least one preferred embodiment of the present invention, a main body portion having a rear pistol-grippable portion for conveniently accommodating the clenched hand of the user, a hinge-moveable triggering component attached to a forwardly arching, flared portion; a hinge-moveable, triggering, pivoting arm capable of both forward and rearward arch-like movements; said pivoting arm provided with an optimally located hole to conform to a wide variety of forefinger shapes and sizes; said hole being positioned at one end of said hinge-moveable, triggering, pivoting arm at the opposite end of the hinge attachment of said hinge-moveable, triggering arm to said forward main body portion.

13 Claims, 17 Drawing Sheets

HAND-HELD DEVICE FOR CATCHING AND TRAPPING INSECTS

BACKGROUND OF THE INVENTION

Field of the Invention

This present invention relates generally to catching and trapping insects or bugs catcher and trapper. More particularly, it deals with some effective sanitary methods and hand-held devices that enable the users to quickly catch and trap insects or bugs by interception means and crushing or smashing those targeted caught and trapped ones and preventing or minimizing the spillage of their bodily debris and exuded body fluids, in one preferred embodiment. In another alternative preferred embodiments, the said invention provides certain specific methods and devices that intercept, and swiftly catch or trap those reachable targeted insects or bugs, capturing them alive inside a pair of cup-like concave pair of flapping components.

The end results of the present invention are effected by means of the selected unique, preferred embodiments in the specifically coordinated integrated structures and functions achieved by a combination of the following: a main body portion having a rear hand-gripping pistol-shaped handle that extends and flares forwardly, a pivoting arm linked firmly, but smoothly like a lever to said main body portion by means of a rivet-bushing, a set of two slender rigid rods having a common hooked central rear arching section hooked to the upper portion of said pivoting arm by means of a hooking slot, hinge-like connecting means for said pair of rigid rods to the respective pair of flapping components, and a pair of equidistantly placed horn structures as connector means for attachments between said pair of rigid rods and said flapping components.

Prior Art

The inventor of this presently applied for invention has conducted a careful indepth review and analysis of both utility patents and design patents issued to Reaver et al granted with U.S. Pat. No. 5,207,018, Miley granted with U.S. Pat. No. 4,617,754, Weaver granted with U.S. Pat. No. 4,793,094, and including Lisitza, granted U.S. with U.S. Design Pat. No. Des 311,050, and U.S. Design Pat. No. granted to Springfellow Des 269,796.

As a result, the said inventor of this applied for present invention is truly convinced that, based on the abovesaid prior art references, the basic combination of elements of the said cited reference utility patents and design patents are different from his invention, and therefore, do not preclude the obtainance of a utility patent sought for by present inventor on this instant invention. The comparisons were based on the following points:

a) uniqueness in the totality of combinational elements of the various components and integral parts, and, b) the totality of combinational functions with the related embodiments, and c) unobviousness factors.

The totality of the preferred embodiments invention have not been substantially anticipated in the previous prior art patents mentioned above, and that the present preferred embodiments of said instant invention do not appear obvious to those skilled in the art.

SUMMARY AND OBJECTS OF THE PRESENT INVENTION

The present invention generally pertains to a simple process, method as well as some integratable combinational components in the form of a structural device for catching or trapping insects or bugs.

Specifically, one object of the present invention is to provide a hand-held device for the purpose not only of easily catching and trapping airborne or crawling or stationary insects or bugs, but also of preventing the undesired splattering of the crushed body parts as well as the exuding or spilt body fluids and other unwanted debris into the immediate surrounding environment such as food, drinks, clothings and other stuffs that can be spoiled or affected negatively during its use around picnics, barbecue parties or at and around dinner tables.

Another object of the present invention is to provide some insect or bug-trapping or catching device that can easily be washed or cleaned with water or other cleaning fluid agents such as liquid and/or sprayable cleaning chemicals, allied with cloths or towels, after its effective use against said trapped insects or bugs.

Still a further object of the present invention is to provide an economical and easily assembled sanitary device that is generally flat, optimally strong, and having a pair of correspondingly fitting, hinge-moveable pair of generally flat flapping components for the purpose of catching or trapping targeted insects or bugs that are airborne, crawling or stationary within reachable distances.

Yet another object of the present invention is to provide the user with a catching or trapping device applicable for insects or bugs, having an optimally placed finger-triggerable pivoting arm that is optimally and centrally coordinated or attached by means of a pivoting rivet-bushing with a generally flat main body that structurally flares forwardly, and having a pistol-like shaped, conveniently grippable handle at the rear portion, and which extends forwardly to provide an intermediate pivotal area for attachment with said finger-triggerable forwardly and backwardly arch-like swinging pivoting arm, which, in combination with a pair of equal-length slender rigid rods as the efficient force-relaying activatable forward-rearward and oppositely sideways moveable intermediary components having a common arched central portion connected or hooked into a slot provided at the upper portion of said pivoting arm, can coordinatively effect the closing and opening of a pair of respectively attached oppositely placed, congruent, equal-sized and similarly shaped pair of flapping components having their rear hinge extensions attached in a hinge-like manner by means of a common bolt to the most forwardly flared hinge extensions of said main body portion of said device, so as to effectively catch or trap insects or bugs within reach of the user or users.

Still a yet further object of the present invention is to provide an alternative oppositely positioned cup-like concave pair of flapping components, which may be of preferably see-through wire-net or made of stiff-fiber-net constructions or combinations thereof, or made of transparent plastic material so as to allow the user or users to easily view the captured insect(s) or bug(s), and at the same time not possibly harm it or them, and which can be used to show around as live specimens, and, in case of school children as user or users, the device can therefore, be used as a sanitary insect or bug catcher, container and transporter for display purposes, and then, said specimens can be brought intact to the schools for classmates and teachers to watch, view and review before said specimens get transferred into glass jars or other containers. In this particular case of said transparent plastic pair of cup-like concave flapping components, they will be provided with tiny holes to allow the inflow and outflow of air to sustain the breathing requirements of said caught insect(s) or bug(s).

And yet a still further object of the present invention is to provide a device with meshed or dimpled or with tiny protrusions inner surfaces of said generally flat pair of flapping components.

Other objects of the present invention can be made apparent as we proceed with the following discussions and descriptions of the functions and relevant descriptions of the structural components and their integrated use or uses as may be found in the illustrative drawings and detailed descriptions.

BRIEF DESCRIPTION OF ILLUSTRATIVE DRAWINGS

FIG. 13 is the frontal elevational view of the same modified embodiment of FIGS. 10–13.

DETAILED DESCRIPTION OF ILLUSTRATIVE DRAWINGS

Figure 1:
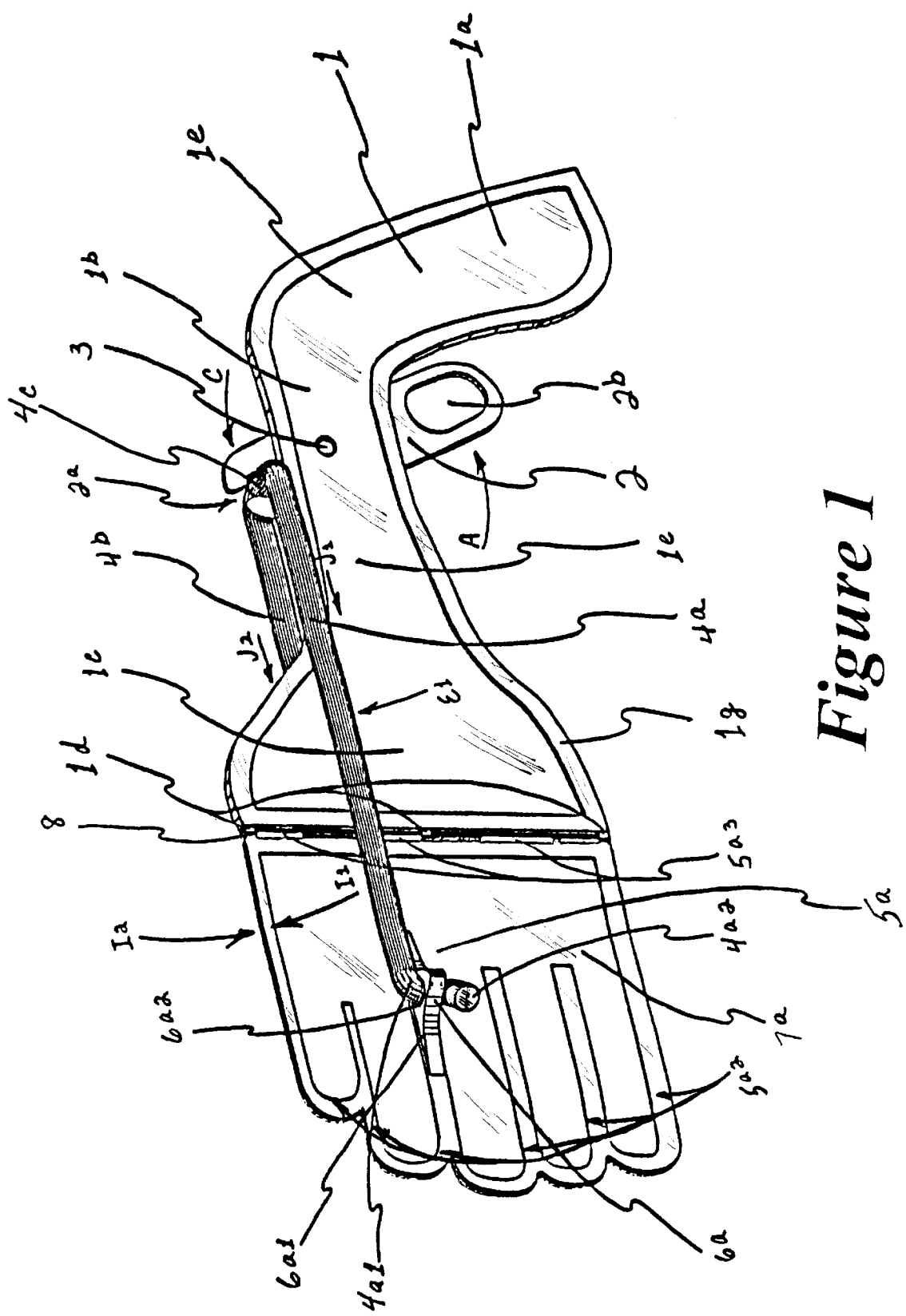
FIG. 1 is a left-side elevational view of one preferred embodiment of the present invention which is the simplified model comprising of at least four main components, singularly, divisionally or in pairs.

Referring now to the illustrative drawings, wherein like numerals and like numeral-letter combinations represent like parts, portions, elements or components, we see in some or in all of FIGS. 1–9, 15 and 16 which illustrate one preferred embodiment of the present invention, showing the device characterized as generally flat, and comprising of a main body 1, being of pistol-shaped design, and having a continuous peripheral thickened section 1g that adds firmness and strength to said main body 1; said main body 1 having a central depressed flat area 1e, and having a hand-grippable pistol-shaped handle 1a, and having a mid-sector extension 1b which provides an area for attachment of a pivoting arm 2 with pivoting rivet-bushing 3 attached to said main body 1; 2 which is a finger-triggerable pivoting arm having a finger-fittable slot 2b at its lower portion, and which also has an upper hooking slot 2a that provides a secured hooking attachment to 4c which is the rearmost arching section of a pair of rigid rods 4a and 4b, both of said pair of rigid rods extending forwardly to be respectively inserted in such a secure way into insertion slots 6a2 and 6b2 of left and right attachment horns 6a and 6b, respectively; said pair of rigid rod having respective left and right end bending portions 4a2 and 4b2 at each of their foremost ends, respectively, to prevent dislodgement of said pair of rigid rods from said insertion slots 6a2 and 6b2; said attachment horns 6a and 6b being equidistantly firmly attached to the respective backsides of each of a pair of flapping components 5a and 5b, having outer structural thickened peripheral portions 5a2 and 5b2 that surround a pair of corresponding left and right thinner central outer sections 7a and 7b of the respective right and left components of said pair of flapping components 5b and 5a; said main body 1 continues to structurally flare forward to form 1c which provides a series of hinge extensions 1d which are formed as holed structural extensions with uniform circularly aligned holes 1x and 1xs (clearly seen in FIG. 15) with a common center and a common internal diametric dimension of said hole 1x and 1xs; said holed structural extensions 1d being at the most forward portions of said main body 1; said 1d are made to inter-link with a strong and firm, optimally straight, circularly defined bolt 8 (clearly seen in FIG. 16) having a uniform diameter; said 1d are also made to coordinate well with the respective series of equal dimensioned structural holed extensions 5a3 of said left flapping component 5a; said 5a3 having internal uniform staightly aligned holes 5y through each of 5a3 structural extensions; the coordinating structural extensions 5b3 of the right flapping component 5b being also provided with holes designated as 5z which have the same internal uniform circular configurations, diameters and straight alignments as those of holes 5y and holes 1x, all of said holes having a common central axis; said 5a3 and 5b3 being the rearmost structural extensions of said respective left and right components 5a and 5b of said pair of flapping components, respectively, so that, in essence, when said series of inter-linking structural extensions 5a3, 5b3 and 1d are altogether straightly aligned with a common center, in order to provide in a stable, yet smoothly swingable fashion, a well coordinated surrounding internal surfaces inside said aligned holes 1x, 5y and 5z to accommodate internally a fittable straight circularly defined uniformly diametered bolt 8 that acts as a centrally strong common pivoting point or of the hinged connection between parts of said main body 1 and said pair of flapping components 5a and 5b that are symmetrically placed, and thereby resulting in the smooth and easy opening and closing of said pair of flapping components 5a and 5b which can be conveniently actuated or activated as controlled by said force- relaying actions of said pair of rigid rods 4a and 4b in conjunction with the swinging actions of said pivoting arm 2.

For clarification purposes, it should be noted that altogether, the common bolt 8 which is straight and of uniform diameter conforms smoothly and with optimal fitting, yet not tightly, into the internal surfaces of all the aligned series of structural extensions 1d, 5a and 5b through the aligned uniformly dimen-sioned holes 1x, 5y and 5z, acting as coordinately hinge counterparts in alliance with common bolt 8.

Figure 2:
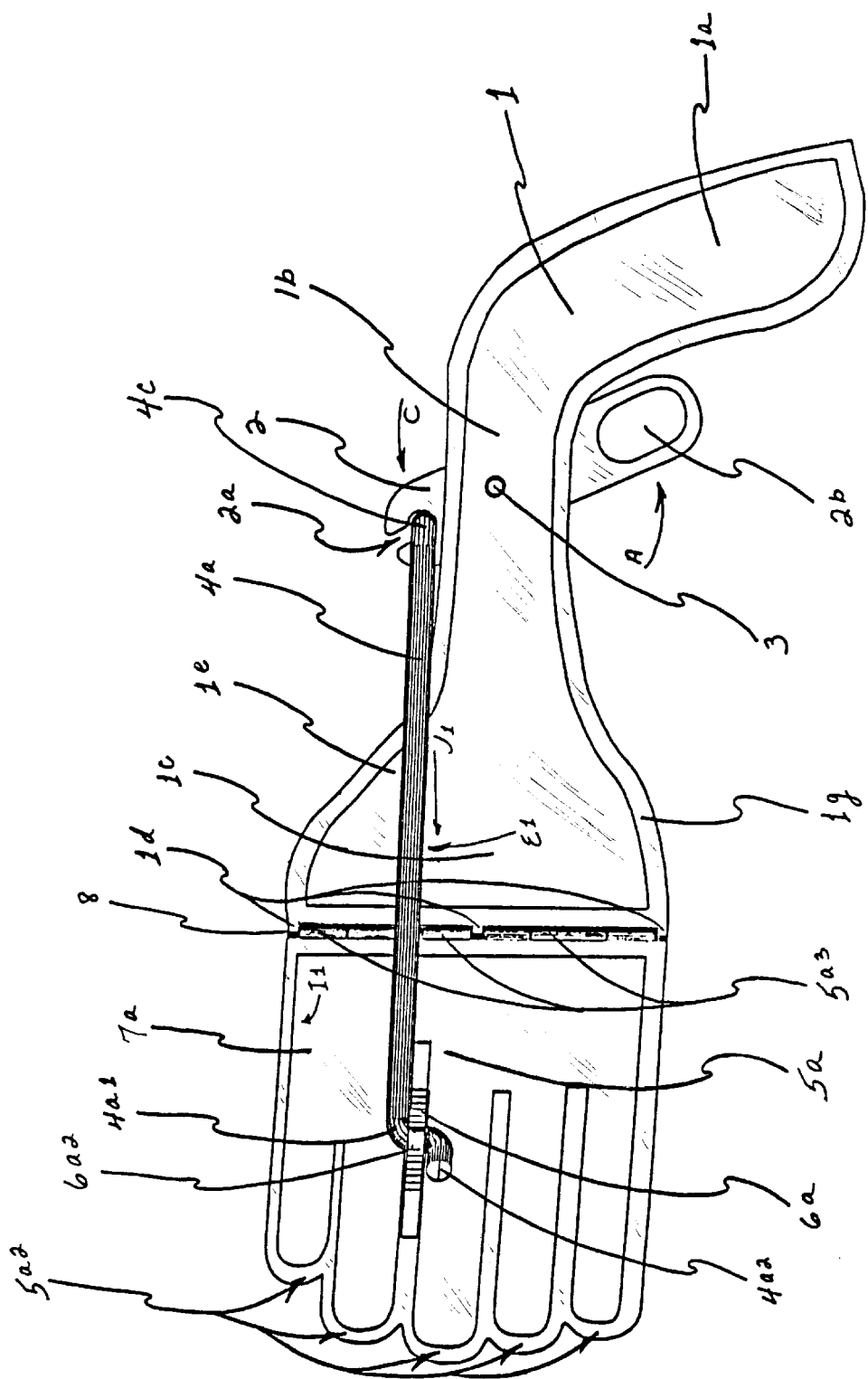
FIG. 2 is a left-side elevational view of the same embodiment as in FIG. 1.
Figure 3:
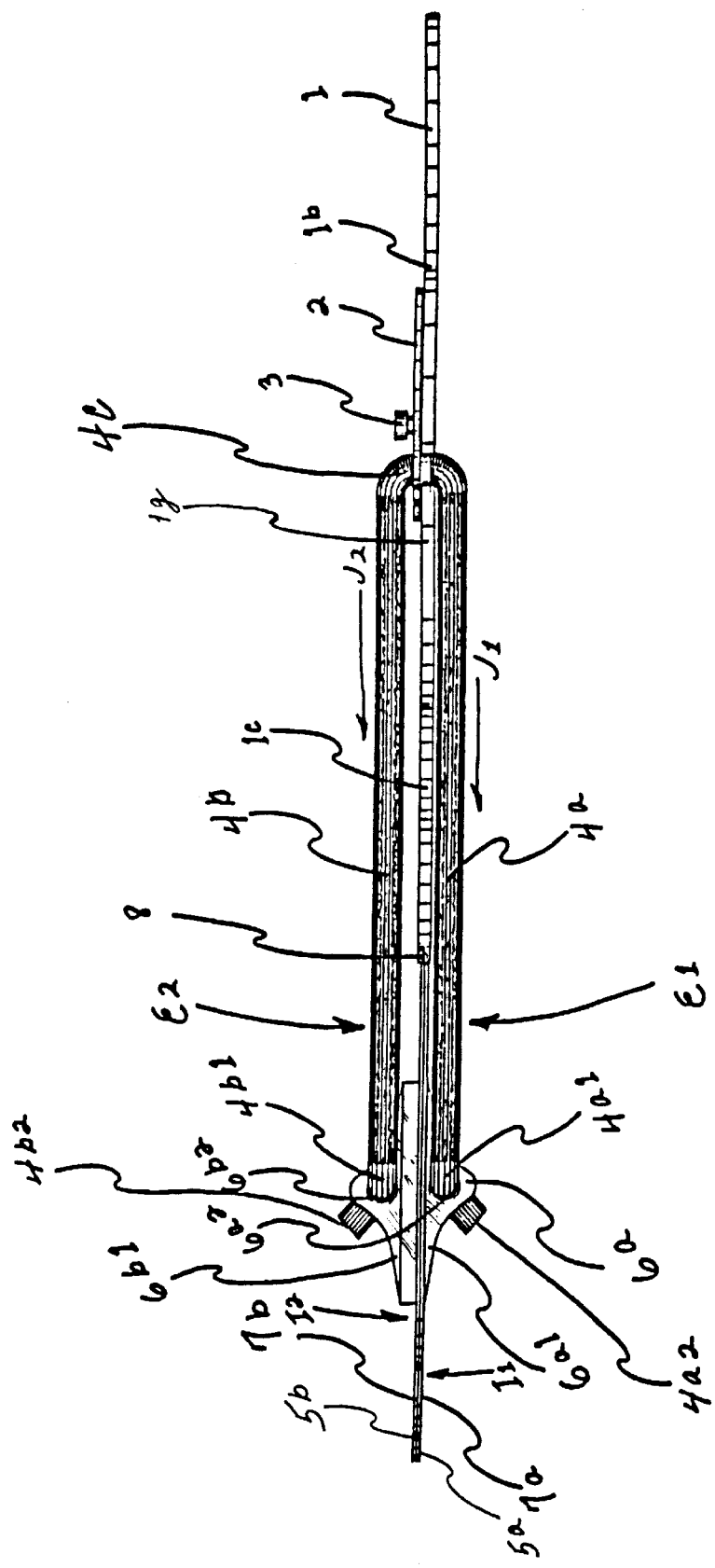
FIG. 3 is a top view of the same embodiment of FIGS. 1 and 2. It also shows the pair of flapping components in the closed position
Figure 4:
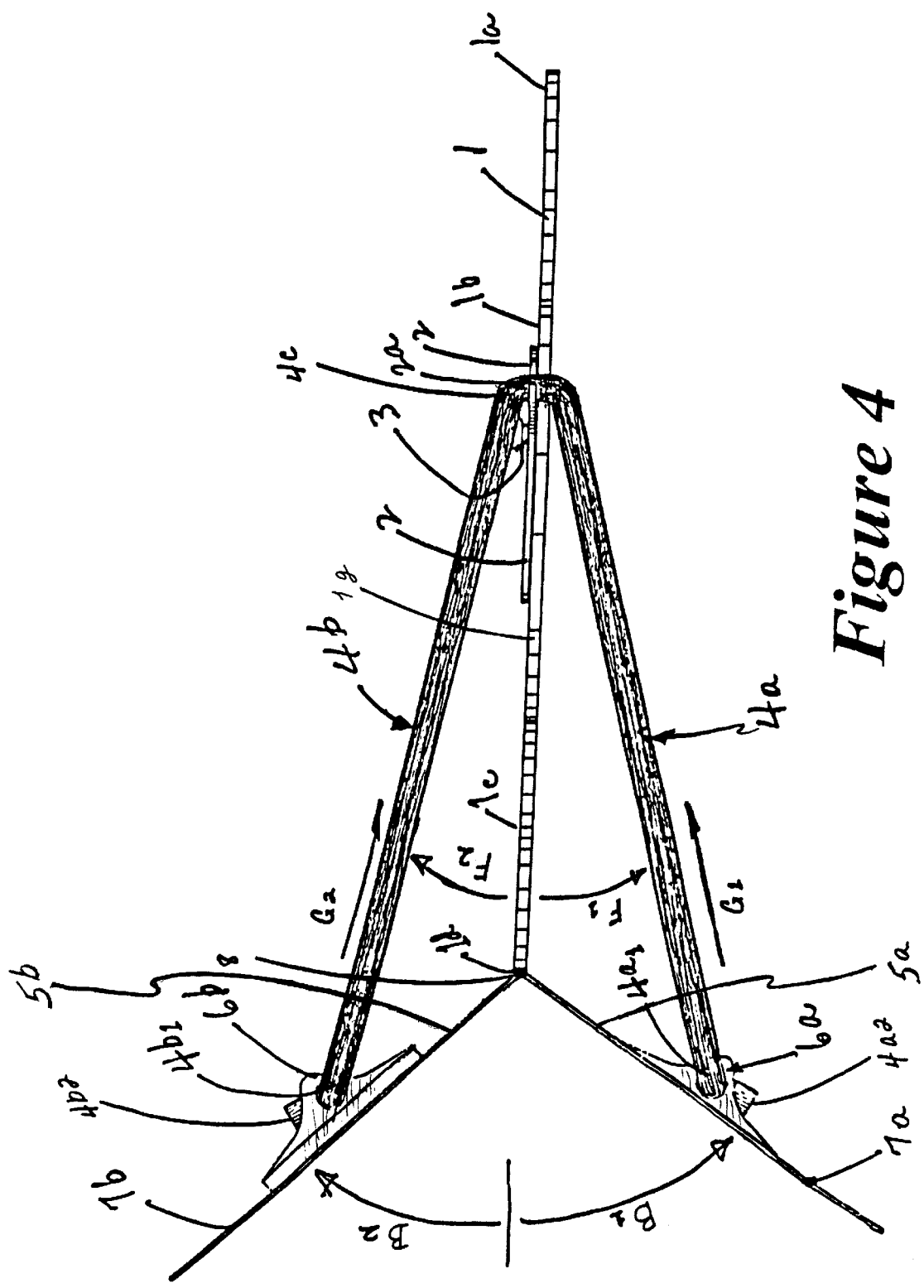
FIG. 4 is a top view of the same embodiment of FIG. 1, and showing the pair of flapping components in the open position.

Essentially, the finger-activatable pivoting arm 2 having finger-accommodating hole 2b situated below said arm will accommodate the finger of the user gripping said handle 1a in an optimal fashion and applicable in size to fit the fingers of the general public, and, when said pivoting arm's hole 2b is pulled immediately by the user's finger toward said handle 1b in a direction indicated as A which is depicted in FIGS. 1, 2, 8 and 9, will effect said pivoting arm 2 to swing with the point of fulcrum at the rivet-bushing 3 attachment area, causing the upper portion of said pivoting arm to swing outwardly in a direction indicated as C in FIGS. 1, 2, 8 and 9, and, since the rearmost central portion 4c of said pair of rigid rods 4a and 4b is hooked into said hooking slot 2a of said pivoting arm 2, said pair of rigid rods 4a and 4b will be pushed at the same time forwardly in a direction indicated by J1 and J2, and closer to each other defined in a direction as of E1 and E2 and clearly seen in the top view of FIG. 3 which also shows the forward pushing of said pair of flapping components 5a and 5b to the closed position, wherein said pair of flapping components 5a and 5b having moved inwardly toward each other in a direction defined as I1 and I2; said directional movements J1, J2, E1, E2, I1 and I2 and their correspondingly involved parts, are for clarification purposes being clearly depicted in FIG. 2, although the some of the other Figures do also show some of these said direct-ional movements.

In FIGS. 4, 5, 6 and 7, which clearly define said pair of flapping components 5a and 5b in the open position, the oppo-sitely directed arrows B1 and B2 are indicated as swinging to the opposite direction as said left and right flapping components swing away from each other to attain said flapping components' open position. Also, in FIGS. 4, 5, 6 and 7, said figure drawings show the directional arrows F1 and F2 which represent the opposite directions of motion of said pair of rigid rods 4a and 4b away from each other, and showing also directional arrows G1 and G2 which represent the backward or rearward motion of said pair of rigid rods as both move rearward together to attain said open position of said pair of flapping components.

Figure 5:
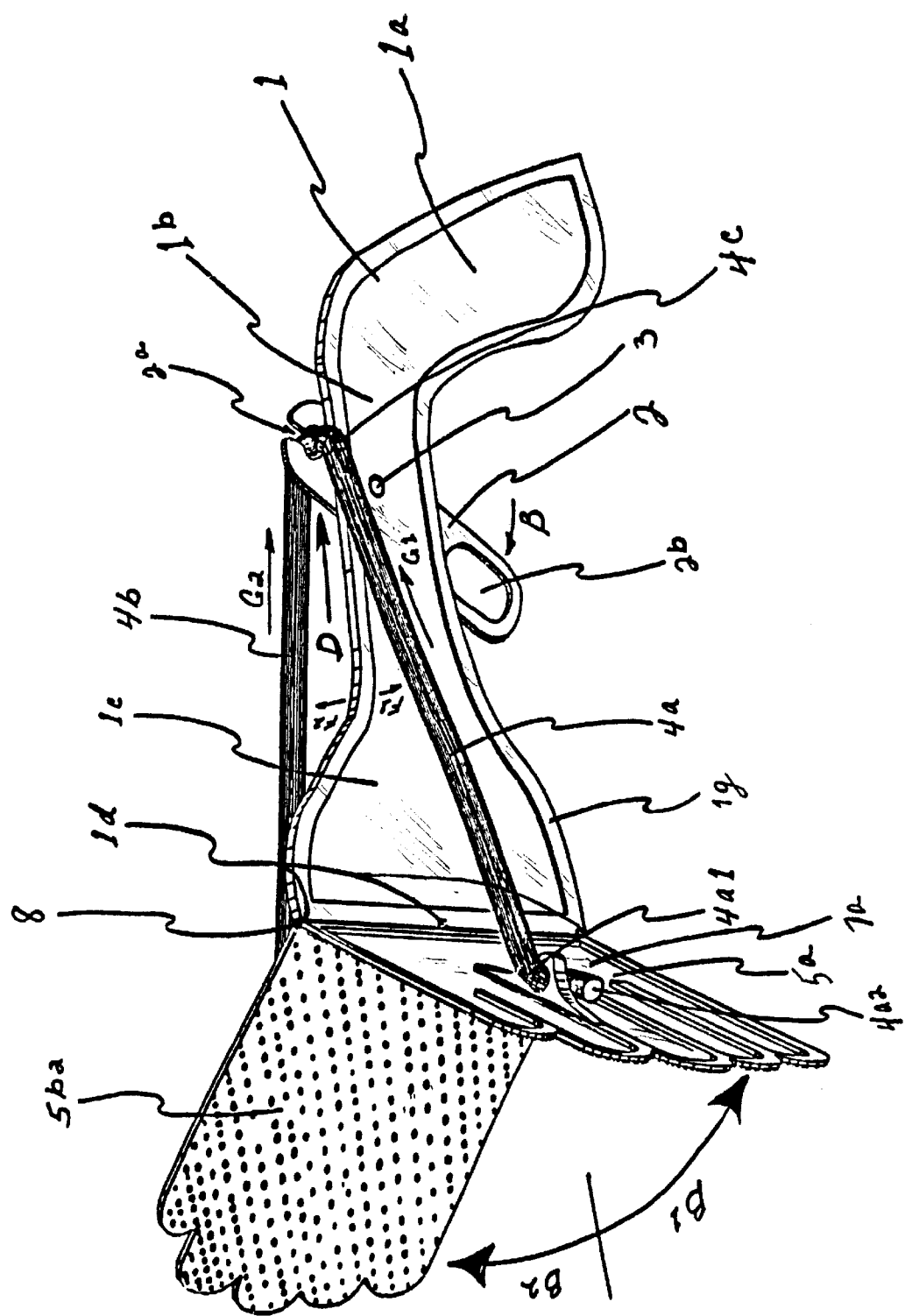
FIG. 5 is the perspective view of the same embodiment depicted in FIGS. 1–4, favoring the left side and top views. It shows the pair of flapping components in the open position.
Figure 6:
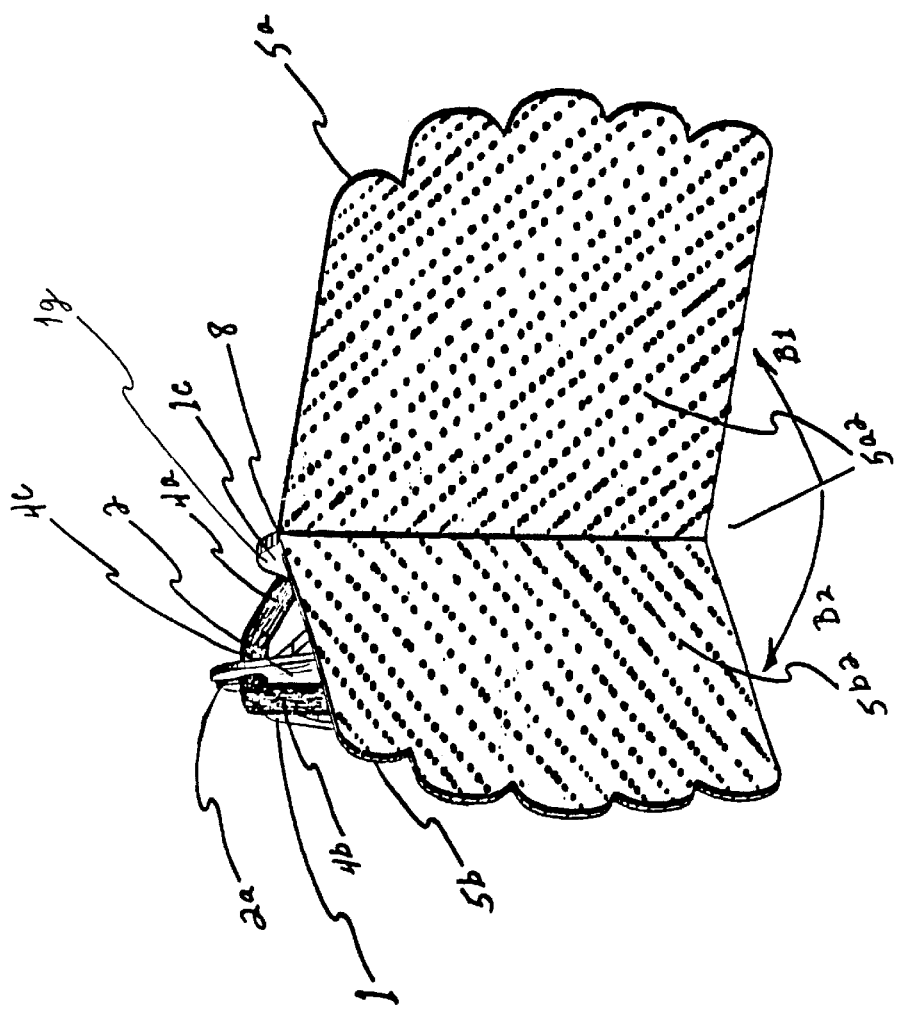
FIG. 6 is a perspective mainly frontal view of the same embodiment as in FIGS. 1–5, while it depicts the pair of flapping components in the open position, and clearly showing the tiny structural protrusions or dimples found at the inside faces of each of the open pair of flapping components. It also favors the top and frontal views of the same embodiment.

In FIG. 6 which is the frontal view wherein said pair of flapping components are in the open position, the internal faces 5a2 and 5b2 of respective flapping components 5a and 5b are shown to have structural dimples or protrusions which help in catching and trapping insects or bugs and preventing and minimizing of spillage of crushed body parts or exuded body fluids and other debris into the immediate environment, thus making the catching and trapping of said targeted caught and trapped insects or bugs more sanitary. FIG. 5 shows the internal face of said right flapping component in the open position, characterized by said internal face being dimpled or having structural protrusions, versus in FIG. 7 wherein the internal face of said left flapping component being shown to have dimples or structural protrusions.

Figure 7:
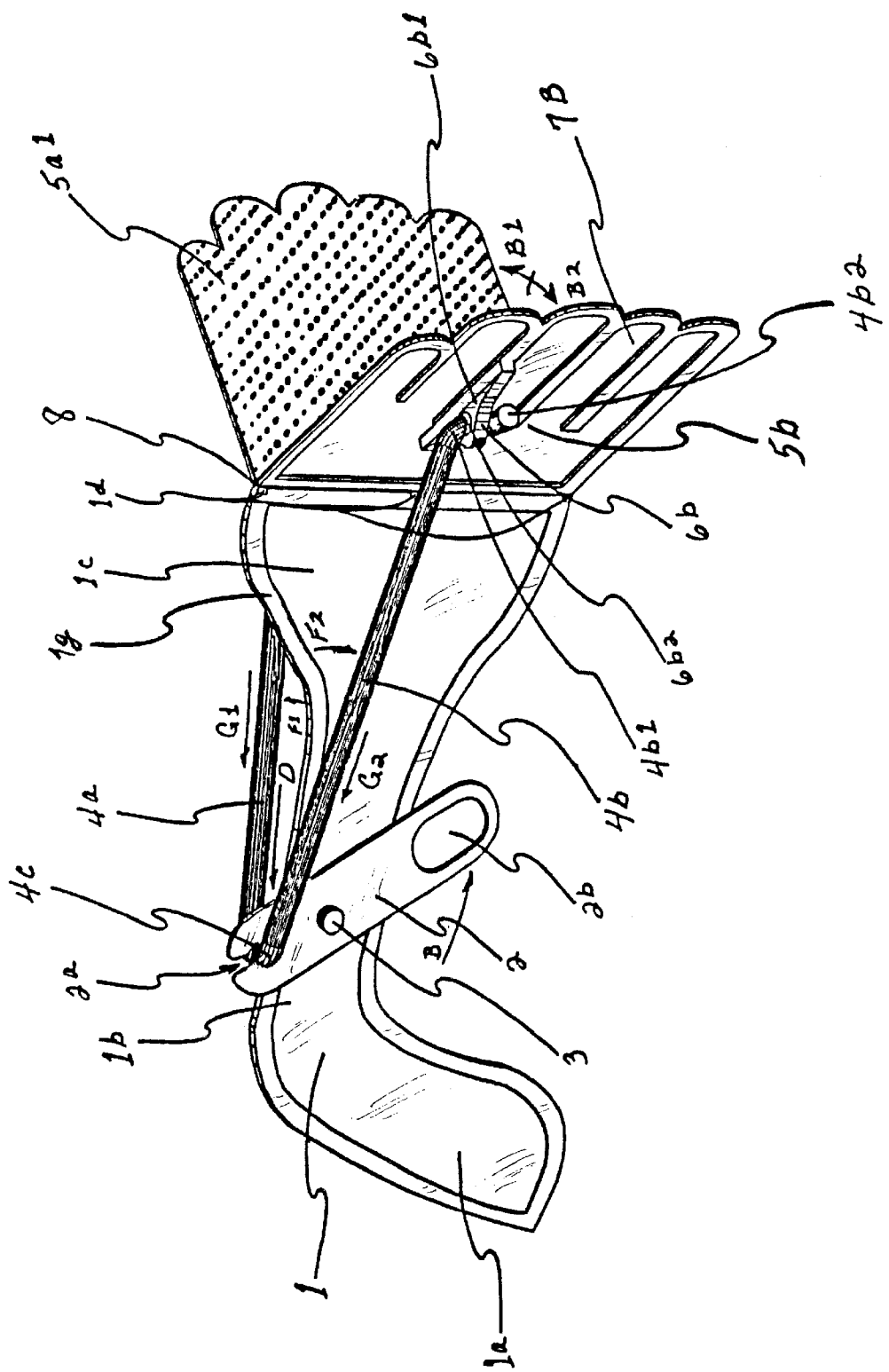
FIG. 7 is a perspective view of the embodiment of FIGS. 1–6 depicting the pair of flapping components in the open position, and wherein the frontal and top views of the same embodiment are favored.
Figure 8:
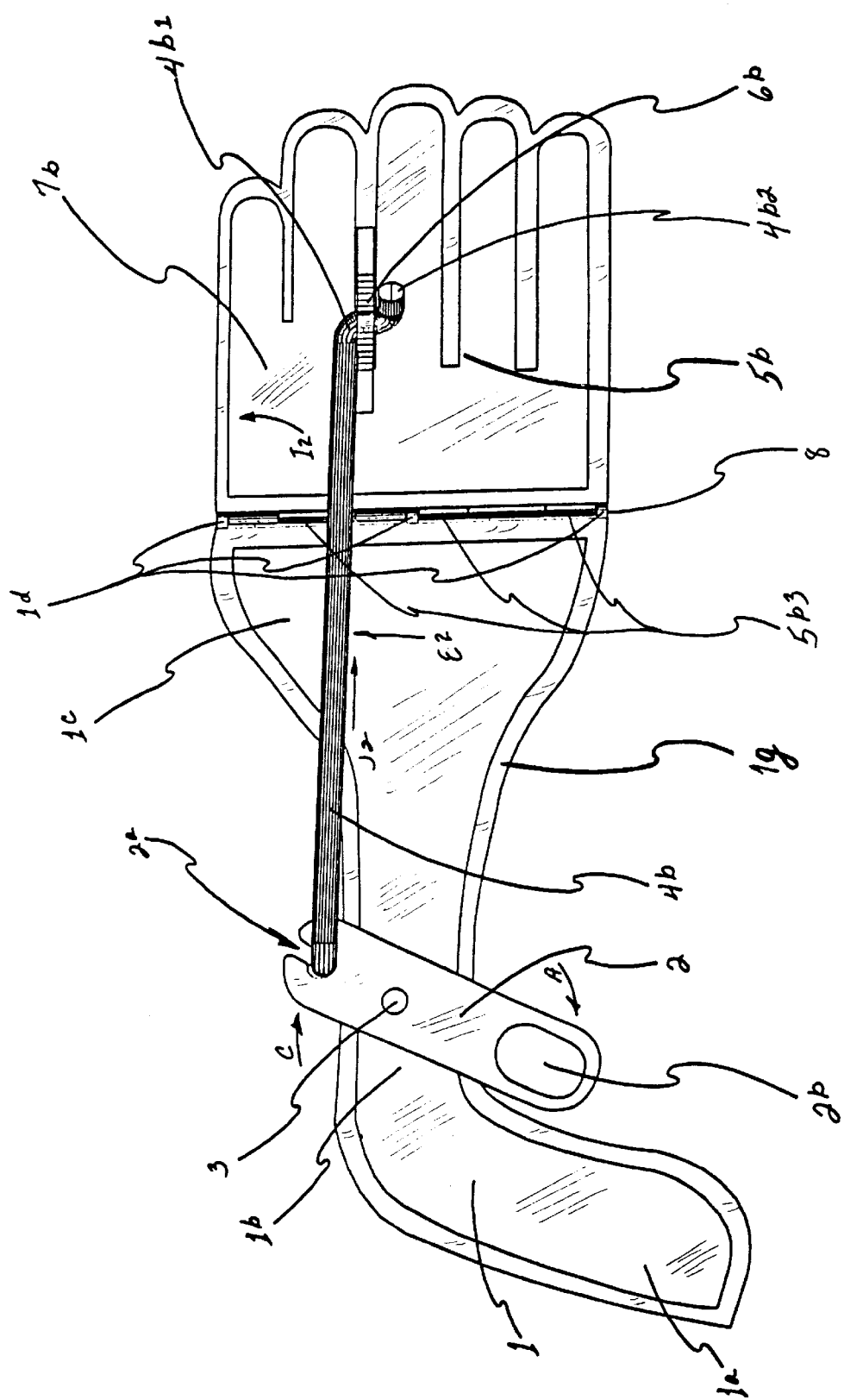
FIG. 8 is a right-side elevational view of the same embodiment of FIGS. 1–7.
Figure 9:
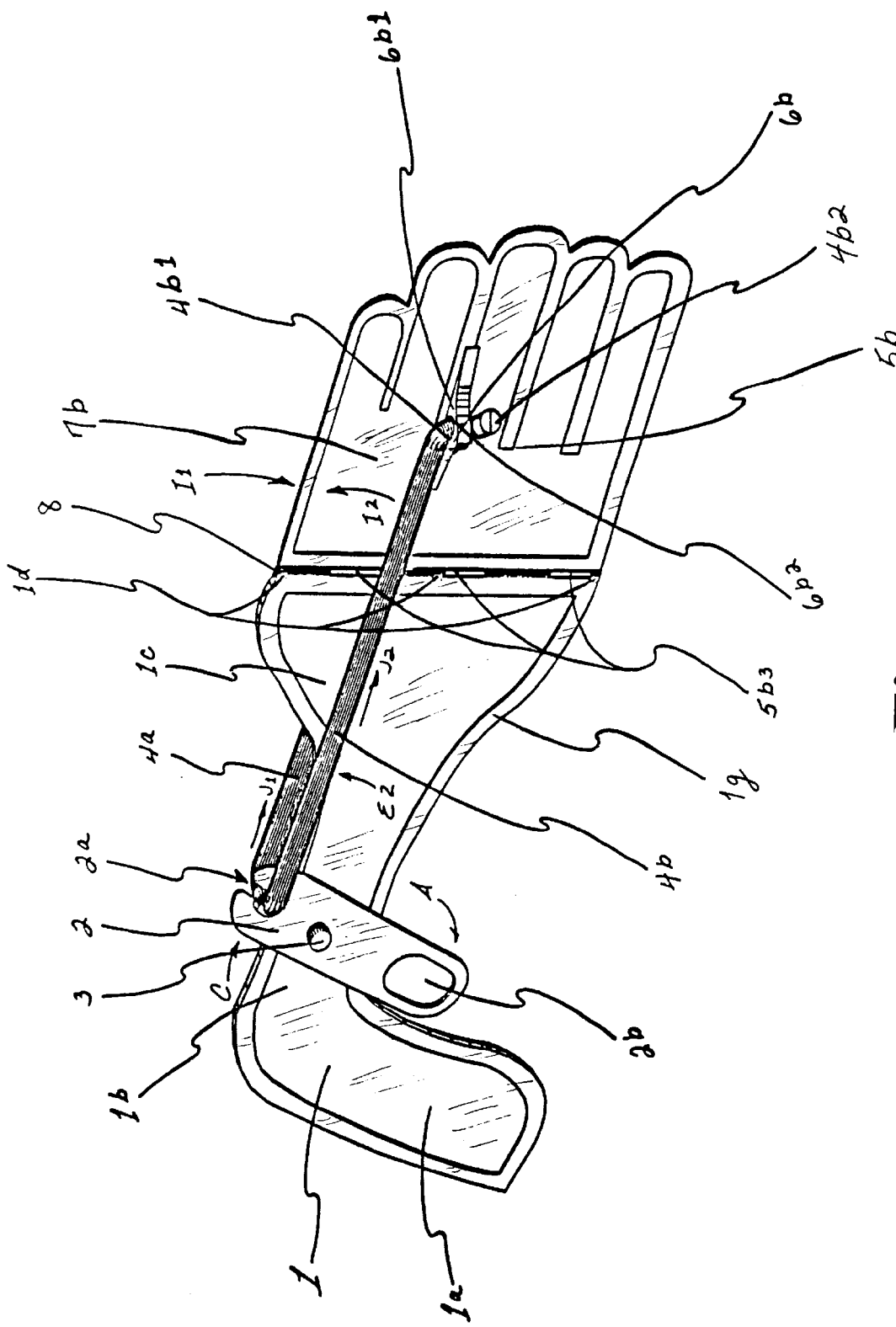
FIG. 9 is a perspective view of the same embodiment of FIGS. 1–8, favoring the right side and top views. It shows the pair of flapping components in the closed position.
Figure 10:
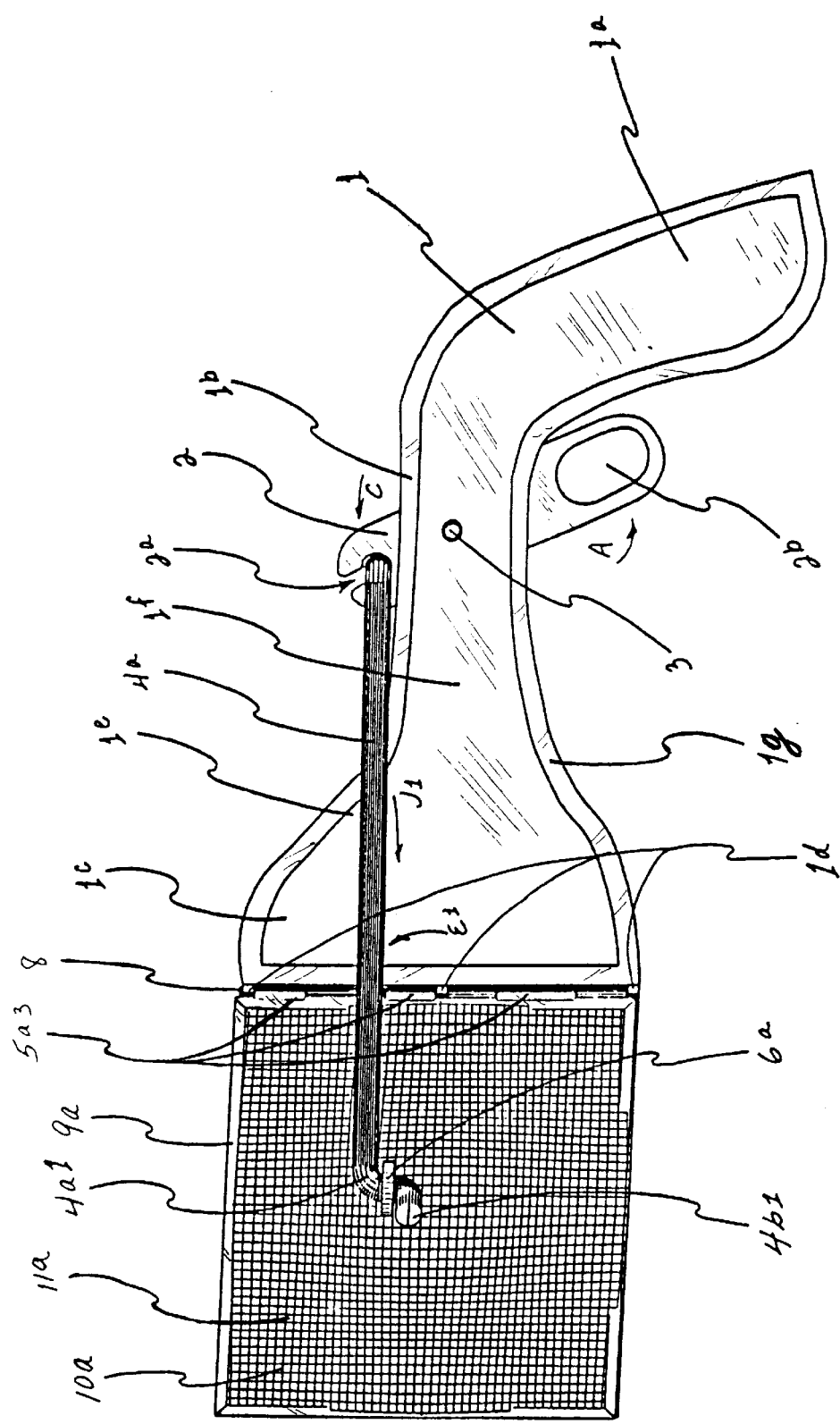
FIG. 10 is a left-side elevational view of another preferred embodiment of the same invention, showing the modified generally meshed net-wire concave cup-like structural shape of the pair of see-through flapping components.

In FIGS. 5 and 7, arrow B shows the outward direction of the lower portion at slot area 2b of said pivoting arm 2, and said arrow B is shown to be going in a direction away from said handle 1a; whereas, in contrast, arrow D shows the opposite direction of the upper portion of said pivoting arm 2 at around said slot portion of said pivoting arm 2, because of the pivoting action of said arm 2 at said rivet-bushing area 3. However, 1, 2, 8 and 9, 10 and 11, the opposite happens, so as to attain the closed position of said pair of flapping components, arrow A representing the direction when pulling the lower portion of said pivoting arm 2, toward the said handle 1b, the upper portion of said pivoting arm transposes to an opposite direction indicated by arrow C, thus pushing said pair of rigid rods and, thereby closing said pair of flapping components closer together.

In practice, therefore, to catch the insects or bugs within range, the user pulls the pivoting arm's lower slot portion 2b closer to said handle 1b, from the extended position of said lower portion of said pivoting arm 2 in the direction of arrow A in order to transpose a pushing oppositely directed force in a direction of arrow C, swinging said pivoting arm's upper portion where said hooking slot 2a pushes said rearmost central portion 4c of said pair of rigid rods 4a and 4b to cause said pair of rigid rods 4a and 4b to push against the backsides of said pair of flapping components 5a and 5b through left and right attachment horns 6a and 6b. By this snappy closing action of said pair of flapping components, the insects or bugs situated therebetween will be caught and trapped.

Conversely, to open said flapping components, the user must push said lower portion of said pivoting arm away in the direction indicated by arrow B away from said handle 1b to cause said pivoting arm 2 to swing around said rivet-bushing attachment 3 in order to transpose an oppositely directed pulling force upon said hooked rearmost central arching section 4c of said pair of rigid rods 4a and 4b at slot 2a of said upper portion of said pivoting arm 2, thereby said pair of rigid rods 4a and 4b pulls at the backside of said pair of flapping components 5a and 5b through said left and right attachment horns 6a and 6b respectively, thereby, opening said pair of flapping components 5a and 5b in the opposite direction indicated by arrows B1 and B2 while said rigid rods 4a and 4b move in the coordinated directions indicated by arrows F1 and F2 as well as G1 and G2. In this open position of said pair of flapping components, the device is again ready to catch and trap insects or bugs within its range.

In FIGS. 10, 11, 12 and 13, there are shown the various views of another alternative embodiment of the present invention, wherein, all the other parts are represented by the same numeral and numeral-letter combinations, except that of the modified pair of flapping compo-nents, wherein said pair of flapping components are configured with a structural see-through meshed construction having a symmetrical oppositely posi-tioned cup-like concave design; said alternative kind of paired flapping components are designated with 10*a* and 10*b* for the left flapping component and the right flapping component, respectively.

In some views of FIGS. 10, 11, 12, 13 and 14, the parts that are exposed of said cup-like concave pair of flapping components are: 9*a* and 9*b* which are the left and right thickened borders of said respective left and right flapping components; said 9*a* and 9*b* affording to strengthen and support the placed meshed cup-like concave wire-net. This type of design is aimed at being able to catch and trap the insects or bugs alive without harming them, and is especially good for those who just want to catch and trap said insects or bugs as for studying, showing around or for specimen purposes for the curious, and for students present to their classmates and teachers in biology or ecology subjects.

Figure 11:
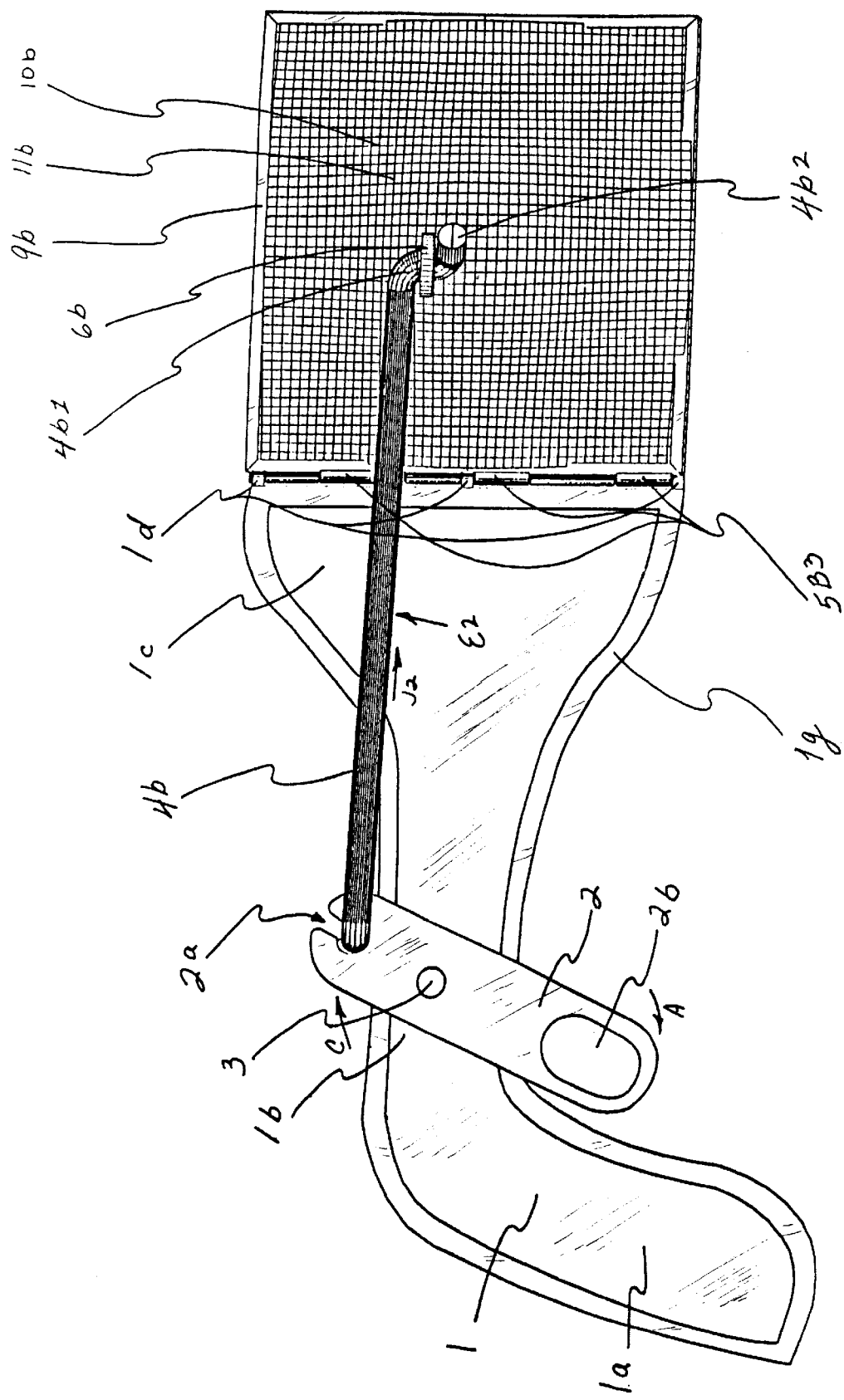
FIG. 11 is a right-side elevational view of the same modified alternative embodiment of the same invention as shown in FIG. 10.
Figure 12:
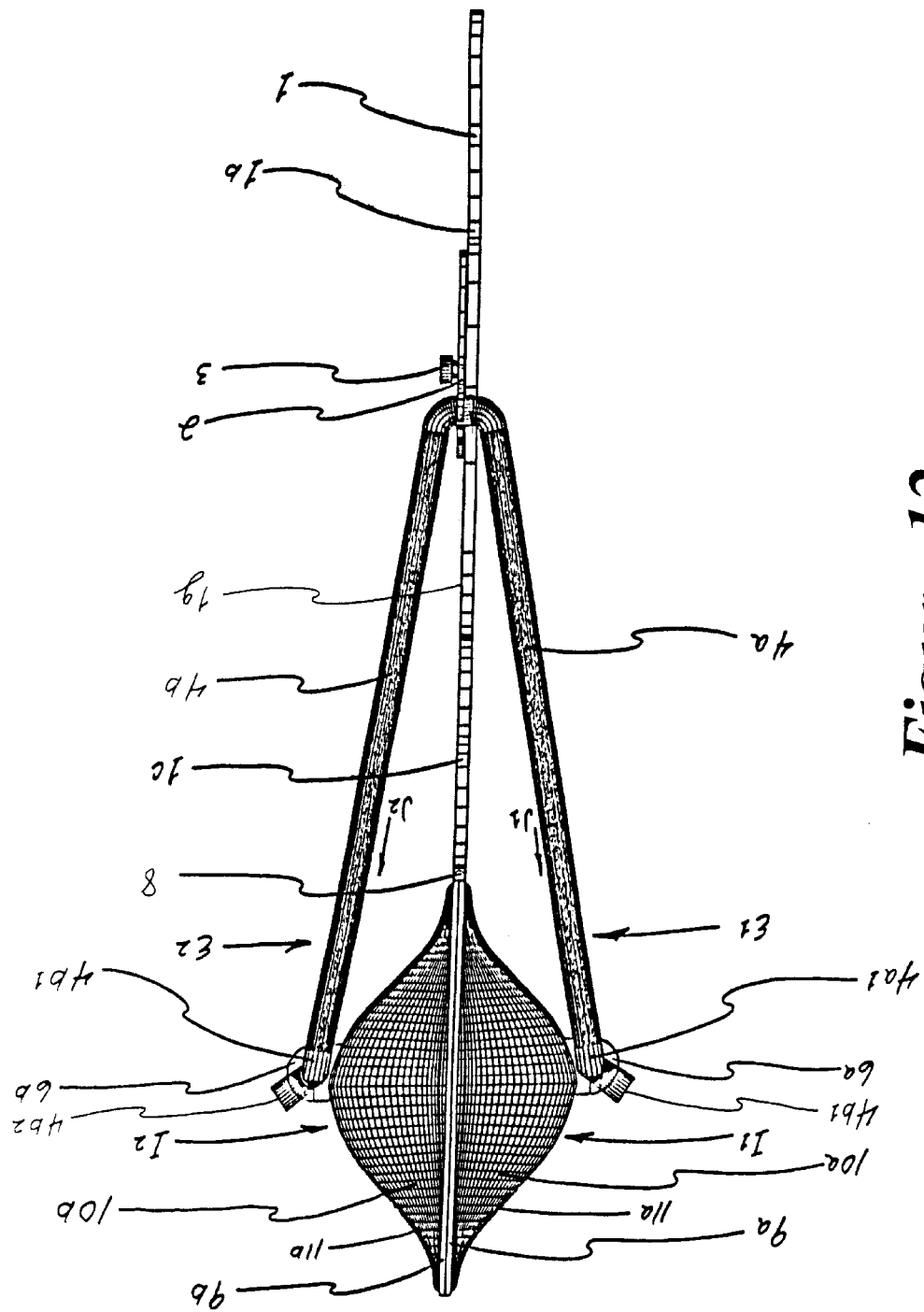
FIG. 12 is the top view in the open position of the same modified alternative embodiment of the present invention as shown in FIGS. 9–11.

FIGS. 11 and 12, being the left-side elevational view and the right-side elevational views, clearly illustrate the position of said pivoting arm's lower portion now most proximal to said handle 1*a*, while said upper section of said pivoting arm at said hooking slot area 2*a* is seen in the forwardly pushed position.

In FIG. 12, which represents the top view of this alternative embodiment, shows the device to be in the closed position, and, wherein said rigid rods 4*a* and 4*b* have been moved closer to each other following arrows E1 and E2 as well as forwardly following arrows J1 and J2, but the difference is that the said pair of rigid rods are still angled because of the structural allowances to accommodate the convex bulgings of said pair of said cup-like inwardly concave and outwardly convex configurations of said pair of flapping components where the ends of said rigid rods are hooked into the holes of said attachment horns 6*a* and 6*b*.

It is to be understood that the see-through mesh of cup-like concave flapping components may be constructed of plastic or fabric materials as other alternatives.

Figure 13:
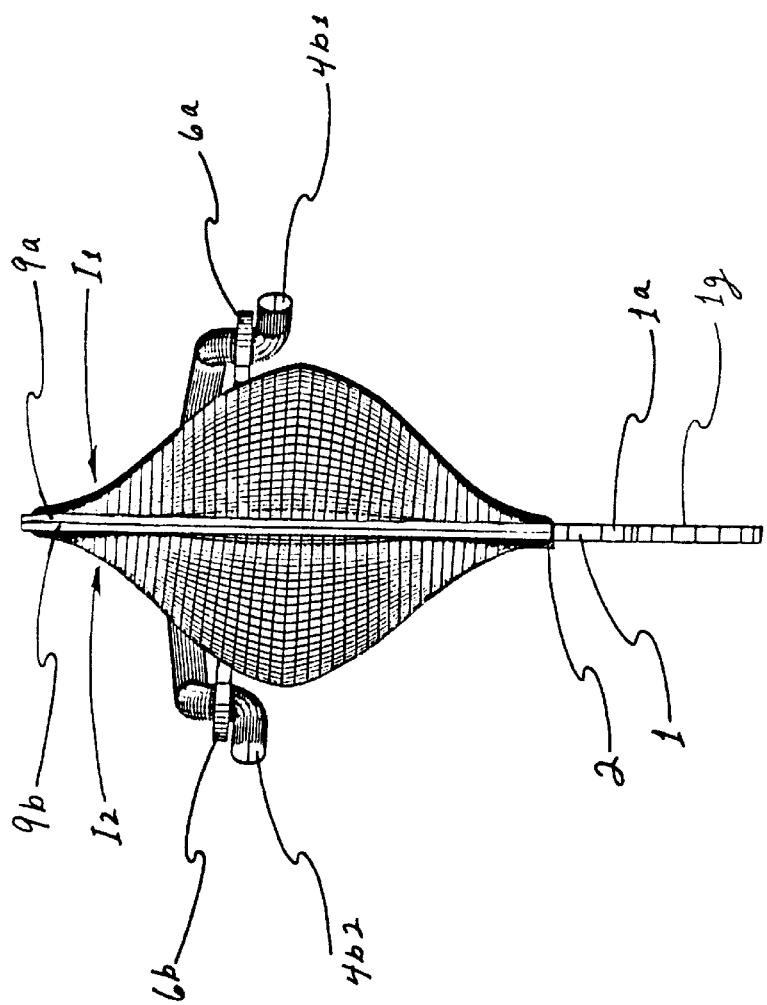
FIG. 13 is a frontal elevational view of the same modified alternative embodiment of the present invention, depicted in FIGS. 9–12.

In FIG. 13, the frontal view of the same alternative embodiment of the present invention reveals how said foremost ends 4*b*1 and 4*b*2 of rigid rods 4*a* and 4*b* stick out after fitting into the holes of attachment horns 6*a* and 6*b*. All other parts represented by like numerals and numeral-letter combinations represent like or similar parts as in the other Figures.

Figure 14:
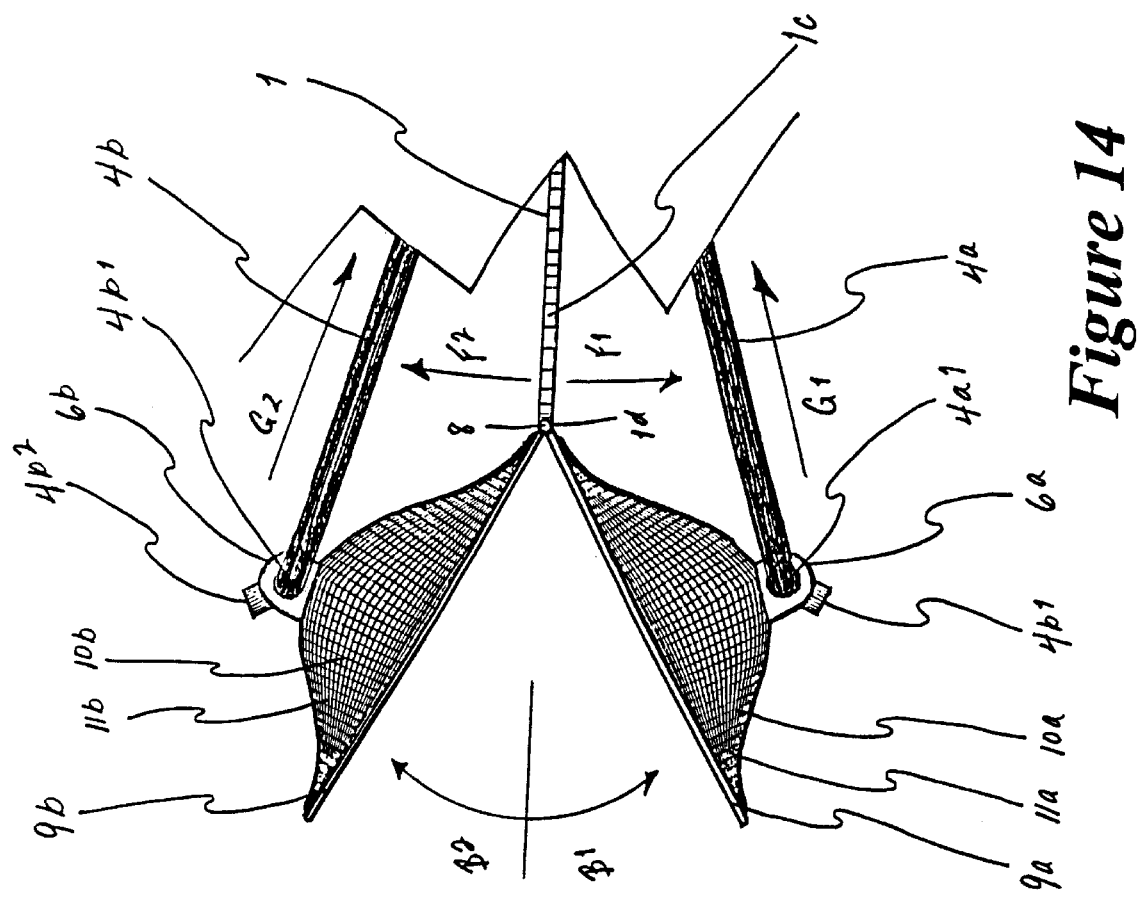
FIG. 14 is the top view in part of the same modified alternative embodiment of part of FIGS. 10–14, showing a cut-away view emphasizing the open position of said pair of cup-like concave flapping component.

In FIG. 14, we see the open position attained by said pair of cup-like concave pair of flapping components after each of said cup-like concave components have followed the oppositely directed arrows B1 and B2, and said pair of rigid rods have followed arrows G1 and G2 rearwardly, and oppositely directed arrows F1 and F2. All other parts of like numerals and numeral-letter combinations represent like parts as in the other relevant Figures.

Figure 15:
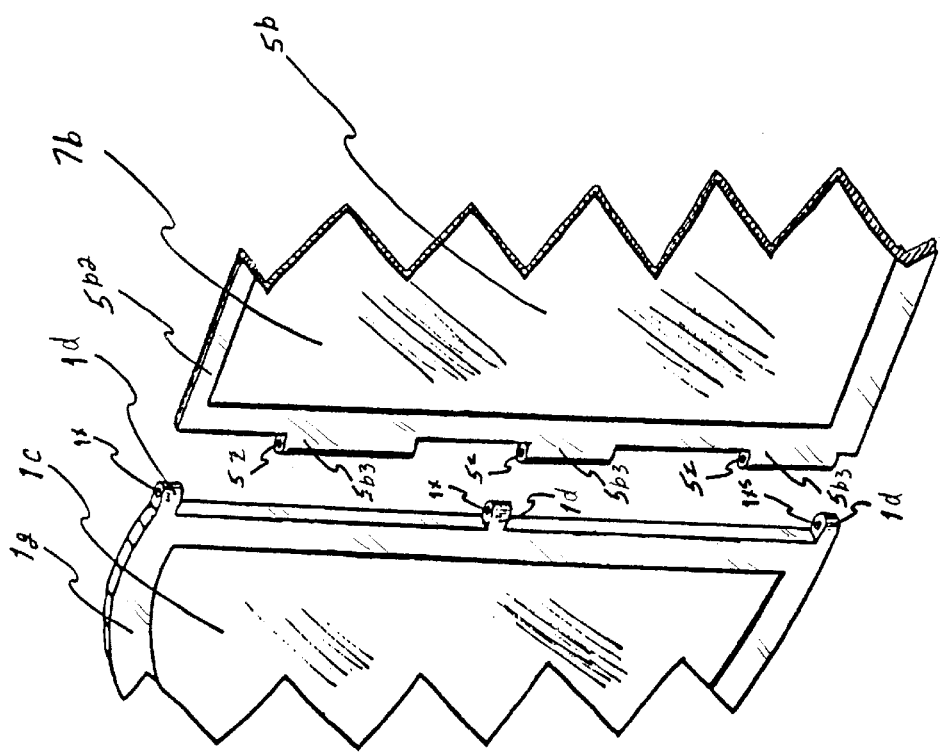
FIG. 15 is a part perspective cut-away exploded view showing the important hinge extensions of the right-side flapping component and those of the flared portion of the main body portion.
Figure 16:
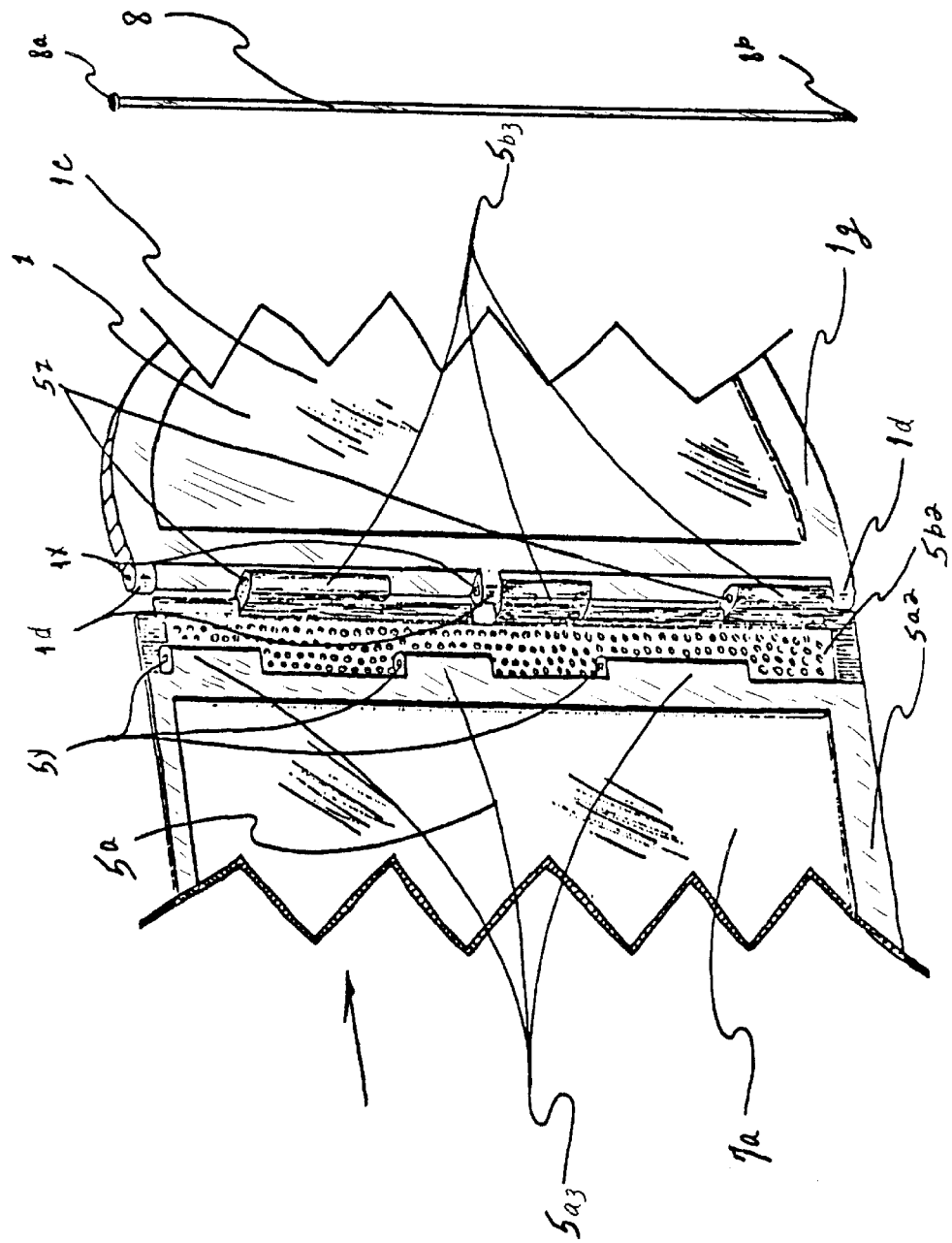
FIG. 16 is a part perspective cut-away exploded exposing the inter-related parts of the hinge extensions of the pair of flapping components and those of the flared potion of the main body portion.

In FIGS. 15 and 16, there are shown the exploded views of the inter-linkable parts or portions of the structurally alignable hinge-extensions 5*b*3, 1*d* and 5*a*3, which have a common central axis of equal diametered holes 5*z* of part of the right-side flapping component, and also showing the structurally aligned equal-diametered holes 1*x* and 1*xs* that penetrate through the hinge-extensions 1*d*; said hole 1*xs* provided with female threaded counterpart that can accommodate the male screw counterpart 8*b* of straight circularly uniform-diametered bolt 8, having a greater diametered bolt top 8*a* (shown in FIG. 16); said bolt design in conjunction with the top 1*d* portion and the bottom 1*d* portion that has screw hole 1*xs*, and the middle 1*d*, altogether help contribute to the firm hold on all the other corresponding hinge components 5*b*3, 5*a*3 with all their correspondingly aligned holes 5*z*, 1*x*, 1*xs* and 5*y*; all of said holes being straightly aligned with a common axis and having equal-diametered circular holes. All of the other parts or components having like numerals and like numeral-letter combinations represent like or similar parts as in all the other relevant figures. Excepting hole 1*xs*, it has a smaller but variant diameters due to its female threaded configuration. The FIGS. 15 and/or 16 also shows 5*a*3 as the most rearward portion of said left-side flapping component; 5*a*2 as the thickened peripheral portion of said left-side flapping component 5*a*; and 7*a* as the depressed section of said left-side flapping component; 5*b*2 as the thickened peripheral portion of main body 1; and wherein all other like numerals and numeral-letter combinations represent like or similar parts as in the relevant figure drawings.

Figure 17:
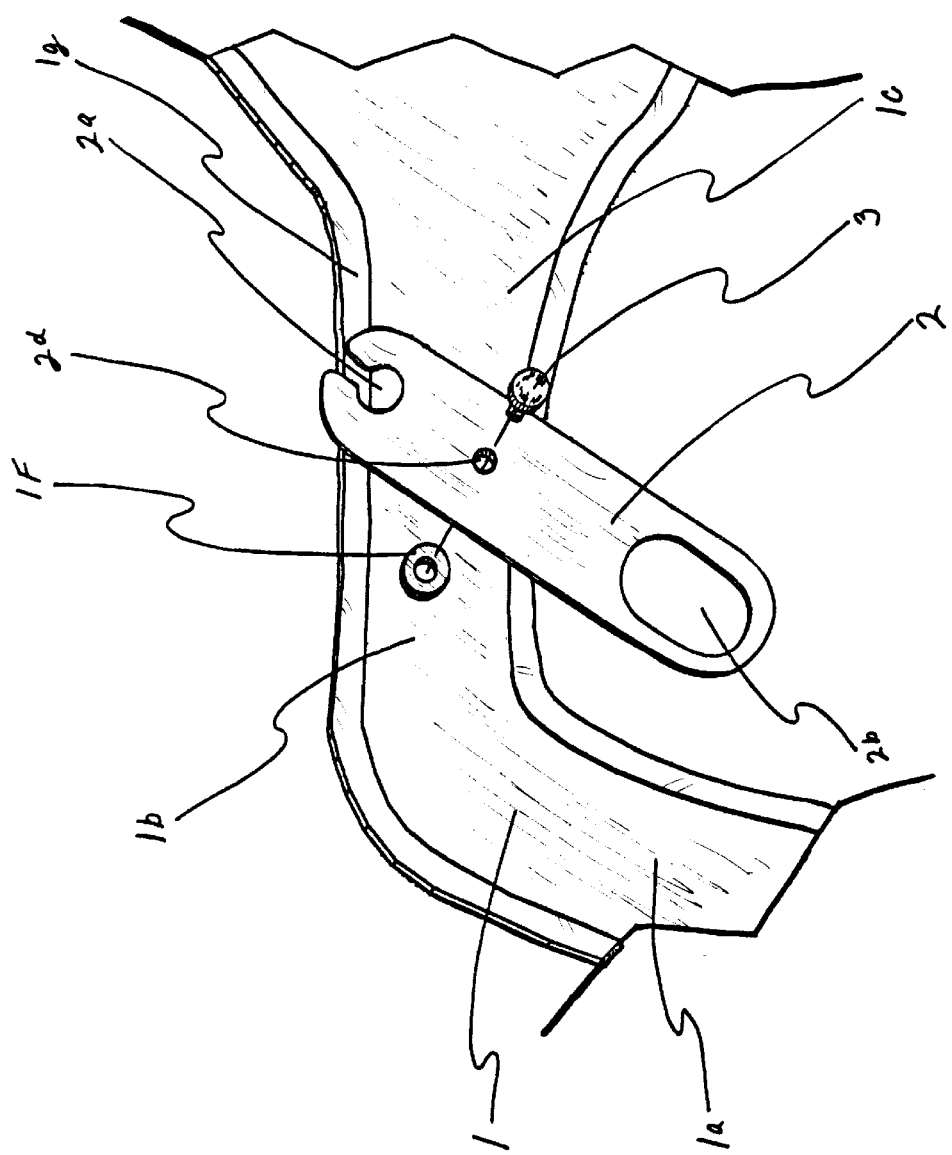
FIG. 17 is the part cut-away exploded view of the inter-related parts of the pivoting arm and the main body portion.

In FIG. 17, we see the exploded view of the hinge-moveable, triggering, pivoting arm 2 showing hole 2*d* to enable the accommodation of rivet-bushing 3, and that structural circular protrusion 1F is a part of said main body portion 1 having a correspondingly sized and shaped hole 1*h* to accommodate optimally said rivet-bushing 3 to attain a firm, steady, smooth, congruent, and hinge-moveble forward and rearward arch-like movements. All other like numeral and numeral-letter combinations represent like or similar parts.

It is clearly stated by said present inventor of said instant invention, that other possible modifications relevant to said invention and embodiments of said instant invention are anticipated by said inventor on said invention and embodiments, though such modifications are not shown in the drawings, as long as they are within the scope or parameters of said present invention and embodiments, which may be considered obvious by those skilled in the art.

It is, therefore, the hope and prayer of said inventor on said instant invention that letters utility patent may be issued to said present inventor on said instant invention.

Following these specifications and drawings, including explanations, anticipations, hopes and prayers, said inventor, Richard W. Walkemeyer, hereby file the following claims for the protection of this intellectual property.

What are claimed as the present inventor's original invention, inclusive of all the illustrated and described as well as those anticipated combinational totality of structural embodiments and their related integral functions, are as follows:

1. A hand held sanitary device for catching and trapping insects comprising:

a main body having a generally flat structural section with a forwardly arching and flaring extension terminating in an outermost hinge extension and a rear pistol grip handle, a movable trigger arm having a finger slot at a lower portion, and an upper hooking slot at an upper portion of said trigger arm, a rivet bushing attachment mounting said trigger arm to a center section of said main body to allow said trigger arm to pivot forward and backward, a pair of equal sized rigid rods each attached to said upper hooking slot at a first end, a pair of flapping components each having a rear hinge extension and having an attachment horn mounted to a backside, each said second end of said rigid rods attached to a respective attachment horn such that moving the trigger will open and close said pair of flapping components;

a hinged connecting means between said rear hinge extensions of said pair of flapping components and said outermost hinge extension of said main body comprising a bolt rotationally engaged between said rear hinge extensions and said outermost hinge extension.

2. The device according to claim 1, wherein said pair of flapping components are flat and having random concave dimples on an inner face so as to trap insects in a sanitary way.

3. The device according to claim 1, wherein said pair of flapping components are a symmetrical pair.

4. The device according to claim 1, wherein said pair of flapping components have a symmetrical concave configuration to form a hollow internal section when said pair of flapping components are brought together.

5. The device according to claim 1, wherein said pair of flapping components are made from see-through mesh wire net.

6. The device according to claim 1, wherein said pair of flapping components are made from meshed fabric net.

7. The device according to claim 1, wherein said pair of flapping components are made from meshed plastic net.

8. The device according to claim 1, wherein said pair of flapping components are made from a combination of meshed plastic, meshed fabric and mesh wire.

9. The device according to claim 1, wherein said pair of flapping components are made from transparent plastic having penetrating holes for the purpose of allowing air inflow and outflow.

10. The device according to claim 1, wherein said pair of rods are made from a pliable plastic having a common diameter.

11. The device according to claim 1, wherein said pair of rods are made from a pliable metal having a common diameter.

12. The device according to claim 1, wherein said pair of rods are wrapped with rubber and a central arching hooking portion is made from rubber.

13. The device according to claim 1, wherein said pair of rods are wrapped with a flexible material.

* * * * *